(12) United States Patent
Higuchi

(10) Patent No.: US 10,986,324 B2
(45) Date of Patent: Apr. 20, 2021

(54) IMAGE PROCESSING APPARATUS, IMAGE PROCESSING METHOD AND STORAGE MEDIUM FOR VIRTUAL VIEWPOINT IMAGE CREATION

(71) Applicant: CANON KABUSHIKI KAISHA, Tokyo (JP)

(72) Inventor: Shugo Higuchi, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/193,620

(22) Filed: Nov. 16, 2018

(65) Prior Publication Data
US 2019/0158802 A1 May 23, 2019

(30) Foreign Application Priority Data
Nov. 20, 2017 (JP) .............................. JP2017-223080

(51) Int. Cl.
*H04N 13/117* (2018.01)
*H04N 13/167* (2018.01)
(Continued)

(52) U.S. Cl.
CPC ....... *H04N 13/117* (2018.05); *G06K 9/00744* (2013.01); *G06K 9/3241* (2013.01);
(Continued)

(58) Field of Classification Search
None
See application file for complete search history.

(56) References Cited

U.S. PATENT DOCUMENTS

2007/0018952 A1* 1/2007 Arseneau ............... H04H 40/27
 345/156
2008/0180439 A1* 7/2008 Adabala ................ G06T 11/206
 345/421
(Continued)

FOREIGN PATENT DOCUMENTS

| JP | 2001276420 A | 10/2001 |
|---|---|---|
| JP | 2003044868 A | 2/2003 |

(Continued)

OTHER PUBLICATIONS

Extended European Search Report for application No. 18206803 dated Mar. 20, 2019.
(Continued)

*Primary Examiner* — Stuart D Bennett
(74) *Attorney, Agent, or Firm* — Carter, DeLuca & Farrell LLP

(57) ABSTRACT

An image processing apparatus includes: an image obtaining unit configured to obtain images based on image capturing by a plurality of cameras capturing an imaging area in a plurality of directions; an information obtaining unit configured to obtain viewpoint information that indicates a virtual viewpoint; and a generation unit configured to generate a virtual viewpoint image based on the images obtained by the image obtaining unit and the viewpoint information obtained by the information obtaining unit, so that in the virtual viewpoint image, transparency of an object at a position that shields an object of interest determined among a plurality of objects positioned in the imaging area is higher than transparency of an object at a position that does not shield the object of interest.

17 Claims, 12 Drawing Sheets

(51) Int. Cl.
*H04N 13/282* (2018.01)
*G06K 9/32* (2006.01)
*G06K 9/00* (2006.01)
*G06T 15/20* (2011.01)
*G06K 9/20* (2006.01)

(52) U.S. Cl.
CPC ........... *G06T 15/20* (2013.01); *H04N 13/167* (2018.05); *H04N 13/282* (2018.05); *G06K 2009/2045* (2013.01); *G06T 2210/62* (2013.01)

(56) References Cited

U.S. PATENT DOCUMENTS

| | | | |
|---|---|---|---|
| 2008/0192043 A1* | 8/2008 | Fujii | G06T 15/503 345/419 |
| 2009/0060352 A1 | 3/2009 | Distante et al. | |
| 2009/0128549 A1* | 5/2009 | Gloudemans | G06T 15/20 345/419 |
| 2009/0138811 A1* | 5/2009 | Horiuchi | G06F 3/04842 715/768 |
| 2013/0342572 A1* | 12/2013 | Poulos | G06F 3/012 345/633 |
| 2014/0333729 A1* | 11/2014 | Pflug | G06T 7/80 348/47 |
| 2015/0325038 A1* | 11/2015 | Baker | G06Q 30/0643 345/426 |
| 2016/0042242 A1 | 2/2016 | Segawa et al. | |
| 2018/0343442 A1* | 11/2018 | Yoshikawa | H04N 21/2143 |

FOREIGN PATENT DOCUMENTS

| | | |
|---|---|---|
| JP | 2007195091 A | 8/2007 |
| JP | 2008071260 A | 3/2008 |
| JP | 2008538623 A | 10/2008 |
| JP | 2010020487 A | 1/2010 |
| JP | 2015219882 A | 12/2015 |
| WO | 2006111928 A2 | 10/2006 |

OTHER PUBLICATIONS

India Office Action for application No. 201844043154 dated Aug. 11, 2020 with English Translation.
Notification of Reason for Refusal issued by the Intellectual Property Office of Korea dated Feb. 5, 2021 in corresponding KR Patent Application No. 10-2018-0143082, with English translation.

\* cited by examiner

FIG. 5A

| SHAPE DATA |
|---|
| (x,y,z) . . . (x,y,z) |
| (x,y,z) . . . (x,y,z) |
| (x,y,z) . . . (x,y,z) |
| (x,y,z) . . . (x,y,z) |
| (x,y,z) . . . (x,y,z) |

FIG. 5B

| SHAPE DATA | ID | TYPE | ATTRIBUTE INFORMATION |
|---|---|---|---|
| (x,y,z) . . . (x,y,z) | 0001 | PERSON | |
| (x,y,z) . . . (x,y,z) | 0002 | SHADE | 0001 |
| (x,y,z) . . . (x,y,z) | 0003 | PERSON | |
| (x,y,z) . . . (x,y,z) | 0004 | SHADE | 0003 |
| (x,y,z) . . . (x,y,z) | 0005 | BALL | |

FIG. 5C

| SHAPE DATA | ID | TYPE | ATTRIBUTE INFORMATION | INTEREST FLAG |
|---|---|---|---|---|
| (x,y,z) . . . (x,y,z) | 0001 | PERSON | | 1 |
| (x,y,z) . . . (x,y,z) | 0002 | SHADE | 0001 | 0 |
| (x,y,z) . . . (x,y,z) | 0003 | PERSON | | 0 |
| (x,y,z) . . . (x,y,z) | 0004 | SHADE | 0003 | 0 |
| (x,y,z) . . . (x,y,z) | 0005 | BALL | | 1 |

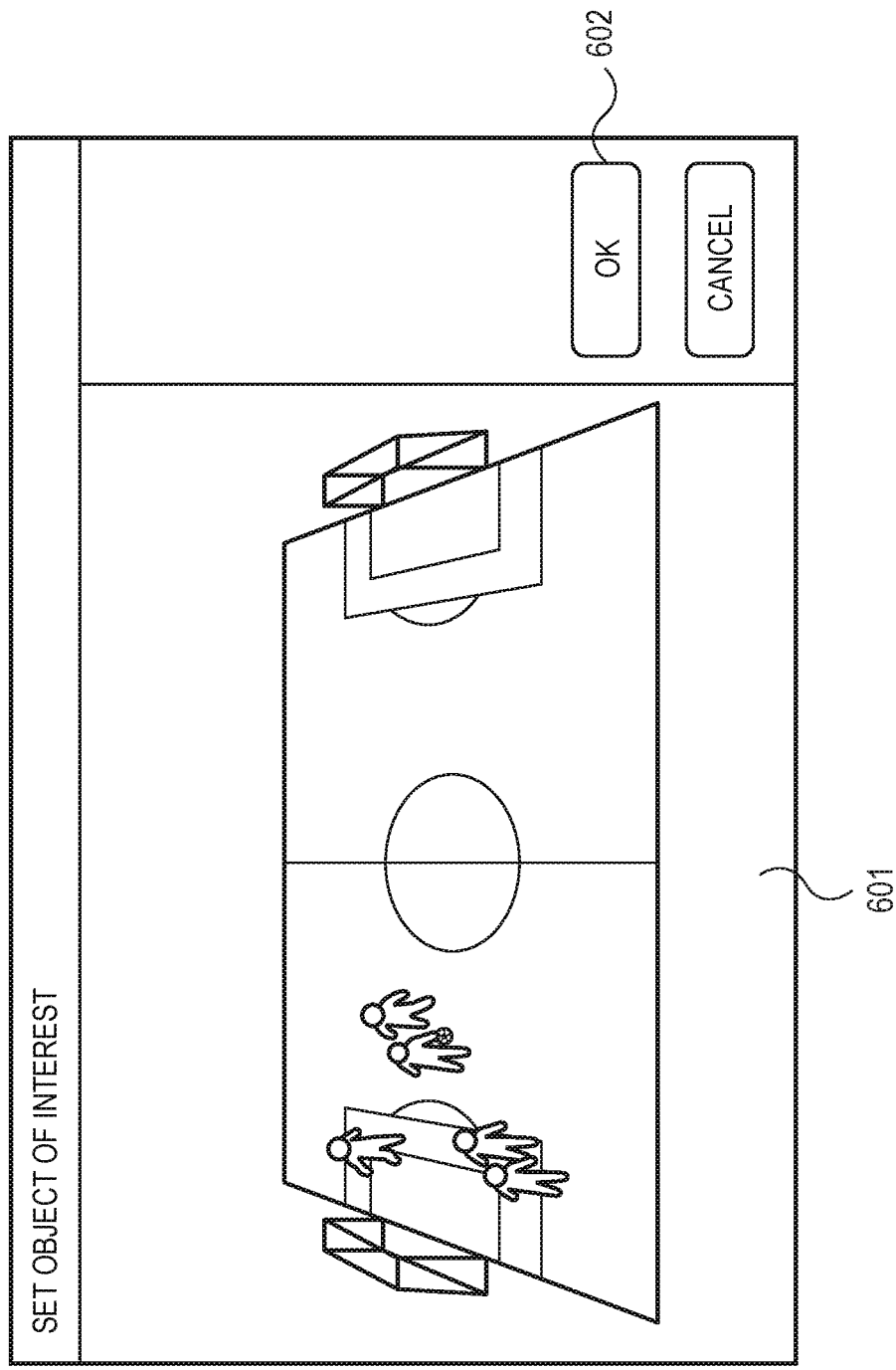

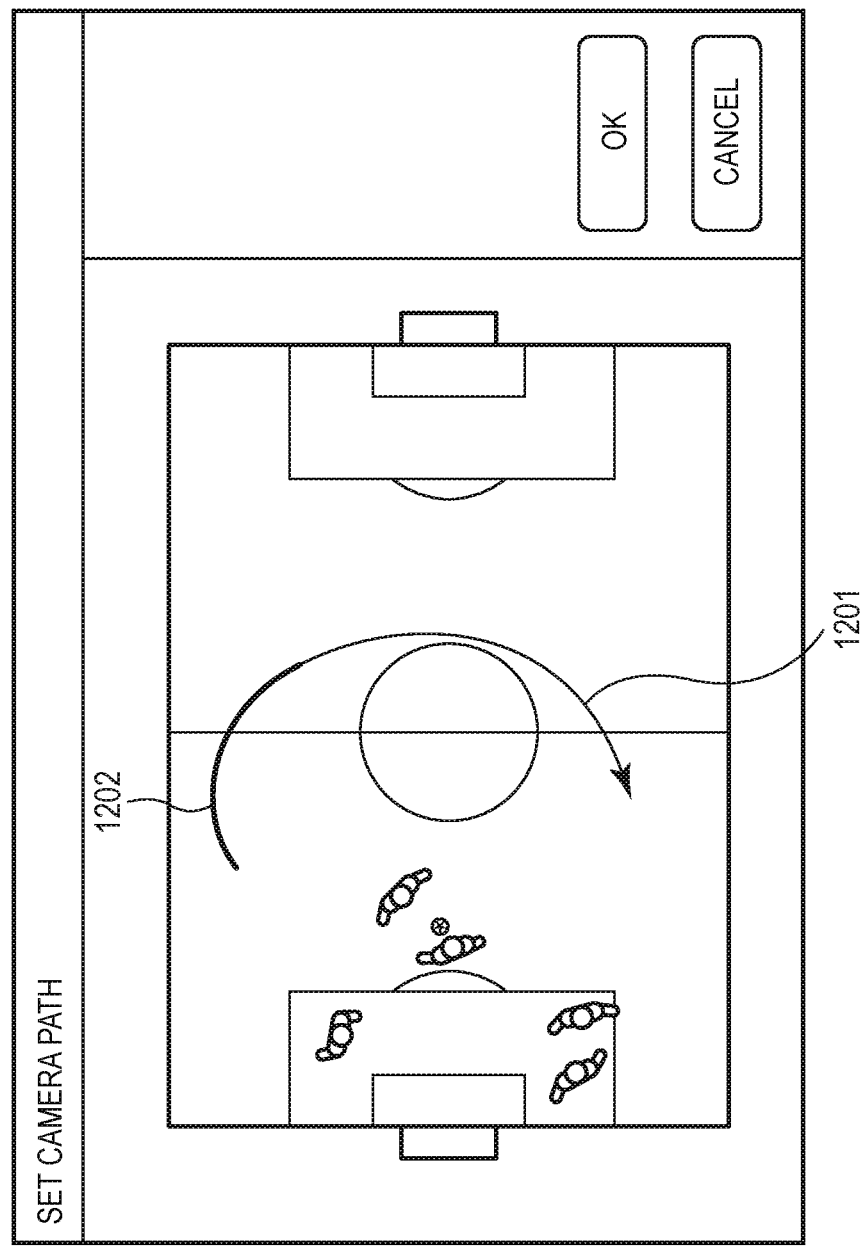

IMAGE PROCESSING APPARATUS, IMAGE PROCESSING METHOD AND STORAGE MEDIUM FOR VIRTUAL VIEWPOINT IMAGE CREATION

BACKGROUND OF THE INVENTION

Field of the Invention

The present invention relates to a technique of generating an image from a virtual viewpoint based on a multi-viewpoint image taken from multiple viewpoint positions.

Description of the Related Art

Techniques of reproducing an image from a camera (virtual camera) that is virtually disposed in a three-dimensional space but is absent in actuality using images taken by multiple real cameras include a virtual viewpoint image technique (Japanese Patent Application Laid-Open No. 2010-20487).

When a virtual viewpoint image is generated, at a certain position of a set virtual viewpoint position or in a certain line-of-sight direction, a high-quality virtual viewpoint image that satisfy users are incapable of being obtained in some cases. This incapability is often caused by an algorithm of generating the virtual viewpoint image and by the characteristics of the multi-viewpoint image. In view of this point, a technique has been known that clearly shows a user an area where the virtual viewpoint cannot be preset and the direction where the line of sight cannot be directed, and thus limits the setting range of a virtual viewpoint (Japanese Patent Application Laid-Open No. 2007-195091).

If the setting range of the virtual viewpoint is limited as in Japanese Patent Application Laid-Open No. 2007-195091 described above, the representation capability of the virtual viewpoint image to be obtained sometimes becomes insufficient. As for the generation of the virtual viewpoint image, there is a case in which a virtual viewpoint is set at a specific position to improve the representation capability even at the expense of the image quality, and close attention is paid on a specific object in the line-of-sight direction intended by a user. For example, when a virtual viewpoint image of a soccer scoring scene is generated, even at an angle where a shooting player A is blocked by other players B and C, a virtual viewpoint image centered at the player A at this angle is sometimes wished.

SUMMARY OF THE INVENTION

In view of such a circumstance as described above, there is provided the present invention which is directed to an image processing apparatus, comprising: an image obtaining unit configured to obtain images based on image capturing by a plurality of cameras capturing an imaging area in a plurality of directions; an information obtaining unit configured to obtain viewpoint information that indicates a virtual viewpoint; and a generation unit configured to generate a virtual viewpoint image based on the images obtained by the image obtaining unit and the viewpoint information obtained by the information obtaining unit, so that in the virtual viewpoint image, transparency of an object at a position that shields an object of interest determined among a plurality of objects positioned in the imaging area is a higher than transparency of an object at a position that does not shield the object of interest.

Further features of the present invention will become apparent from the following description of exemplary embodiments with reference to the attached drawings.

BRIEF DESCRIPTION OF THE DRAWINGS

FIG. 5A illustrates an example of an object shape table.
FIG. 5B illustrates an example of an object shape table after a classification process.
FIG. 5C illustrates an example of an object shape table that includes an additionally set interest flag.
FIG. 6 illustrates an example of an object-of-interest setting screen.
FIG. 12 illustrates an example of a UI screen indicating a range where the shielding object is present.

DESCRIPTION OF THE EMBODIMENTS

Hereinafter, preferred embodiments of the present invention will now be described in detail in accordance with the accompanying drawings. The configurations presented in the following embodiments are only examples. The present invention is not limited to the illustrated configurations.

Figure 1:
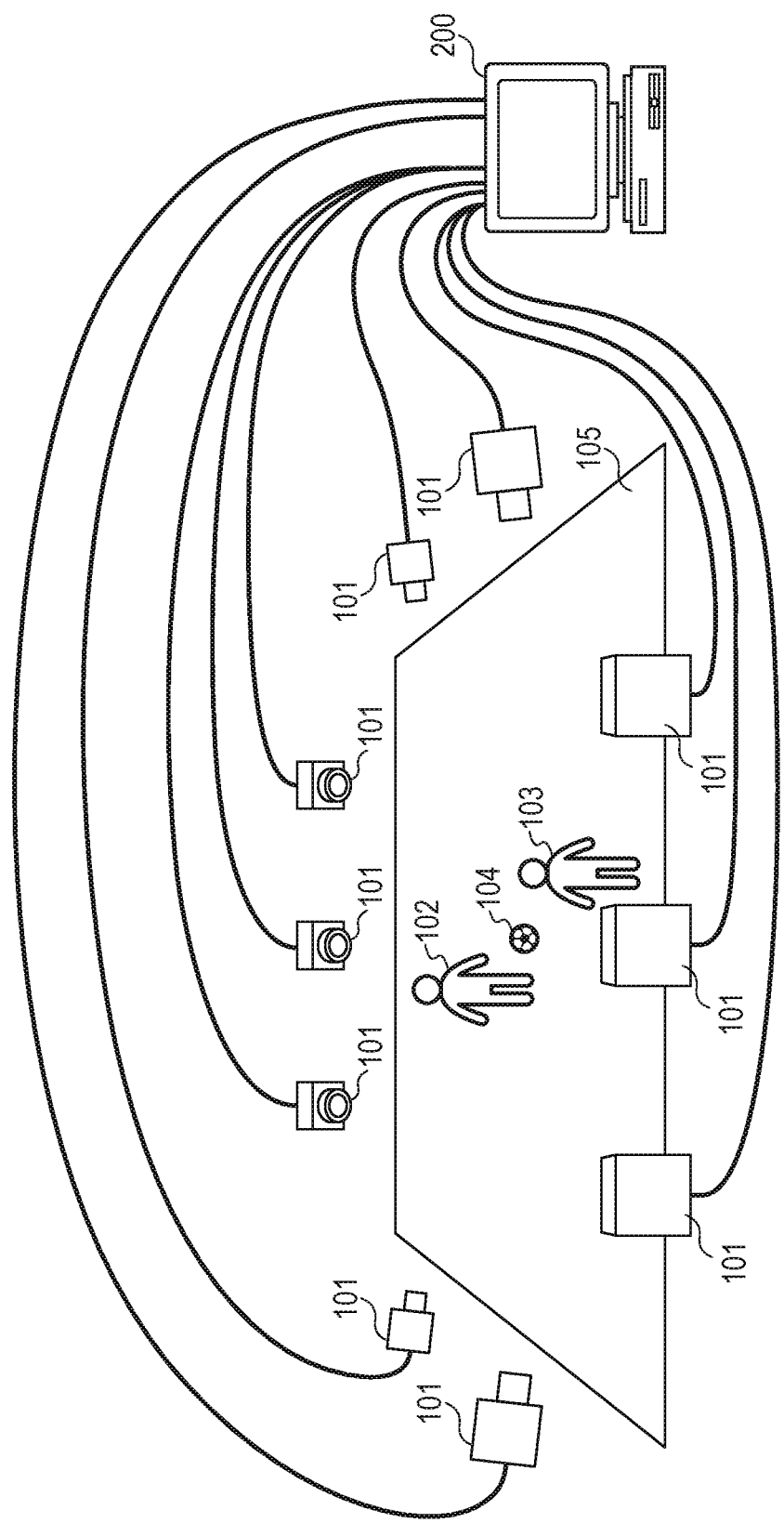
FIG. 1 illustrates an imaging environment and configurations of an image processing system.

FIG. 1 illustrates an imaging environment and a configuration of an image processing system in the present embodiment. In the image processing system illustrated in FIG. 1, players 102 and 103 and a ball 104 on a soccer field 105, which is an imaging area, are imaged by ten cameras 101 disposed to surround the field 105. Image data taken by the respective cameras 101 are transmitted, as multi-viewpoint image data having parallaxes from each other, to an image processing apparatus 200, and are subjected to a predetermined image processing to generate a virtual viewpoint image. The present embodiment is described using an example of a sport scene. Alternatively, a method described later is widely applicable to cases where a virtual viewpoint image is generated from multi-viewpoint images taken by cameras disposed to surround an object serving as an imaging object. Although the number of cameras is ten in FIG. 1, the number is not specifically restricted. However, at least multiple cameras may be present at each of four sides in desirable cases.

Figure 2:
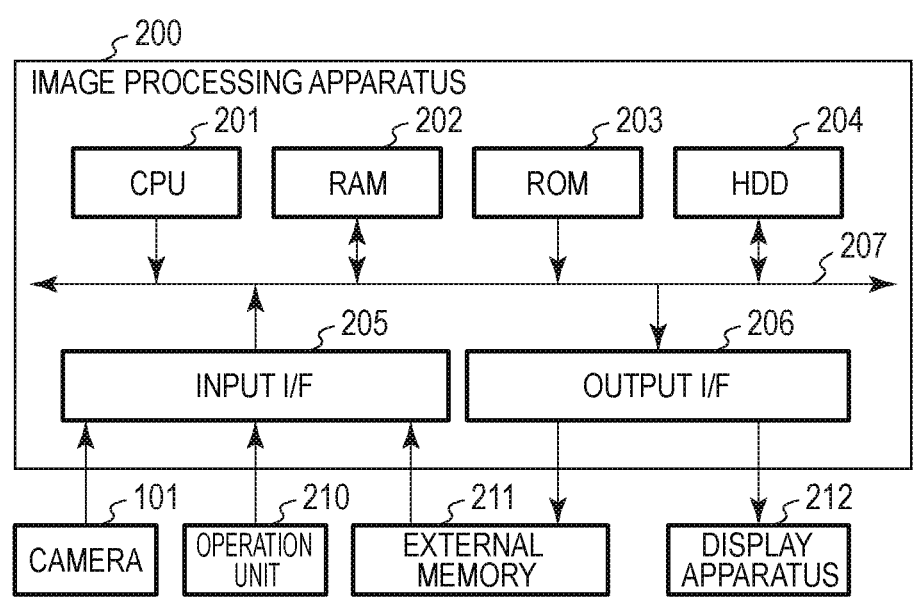
FIG. 2 illustrates an example of a hardware configuration of an image processing apparatus.

The image processing apparatus 200 has a configuration analogous to that of a general information processing apparatus typified by a personal computer. FIG. 2 illustrates an example of the hardware configuration of the image processing apparatus 200. The image processing apparatus 200 includes a CPU 201 a RAM 202 a ROM 203 an HDD 204, an input I/F 205 and an output I/F 206. The elements constituting the image processing apparatus 200 are connected to each other by a system bus 207. The image processing apparatus 200 is connected to the camera 101, an operation unit 210 and an external memory 211 via the input I/F 205. This apparatus is connected also to the external memory 211 and a display apparatus 212 via the output I/F 206. The CPU 201 executes a program stored in the ROM 203 using the RAM 202 as a working memory, and integrally controls the elements constituting the image processing apparatus 200 via the system bus 207. Accordingly, various processes described later are achieved. The HDD 204 is a large capacity storage apparatus that stores various data to be processed by the image processing apparatus 200, and may be an SSD, for example. It is assumed that the HDD 204 stores pieces of information that include the installation position and orientation (line-of-sight direction) of each camera 101, and the focal length of the lens included in each camera 101 (hereinafter, these pieces of information are collectively called "camera parameters"). The HDD 204 is also used to store data on the multi-viewpoint images and images without any object (background image). The CPU 201 can write data into the HDD 204 and reads the data stored in the HDD 204 via the system bus 207. The input I/F 205 is a serial bus I/F, such as USB or IEEE 1394. Data and instructions are input from an external apparatus into the image processing apparatus 200 via the input I/F 205. The image processing apparatus 200 obtains data from an external memory 208 (e.g., any of storage media, such as a hard disk, a memory card, a CF card, an SD card and a USB memory) via the input I/F 205. The image processing apparatus 200 obtains a user's instruction input via the input I/F 205 using the operation unit 210. The operation unit 210 is an input apparatus, such as a mouse and a keyboard, and is used for inputting the user's instruction into the image processing apparatus 200. The output I/F 206 includes a serial bus I/F, such as USB or IEEE 1394, in a manner analogous to that of the input I/F 205. Furthermore, video output terminals, such as DVI and HDMI may be adopted, for example. Data is output from the image processing apparatus 200 to the external apparatus via the output I/F 206. The image processing apparatus 200 displays a GUI (graphical user interface) screen, and a generated virtual viewpoint image data on the display apparatus 212, such as a liquid crystal display, via the output I/F 206. There are other configuration elements of the image processing apparatus 200 other than those described above. However, these elements are not primary points of the present invention. Their description is omitted.

Figure 3:
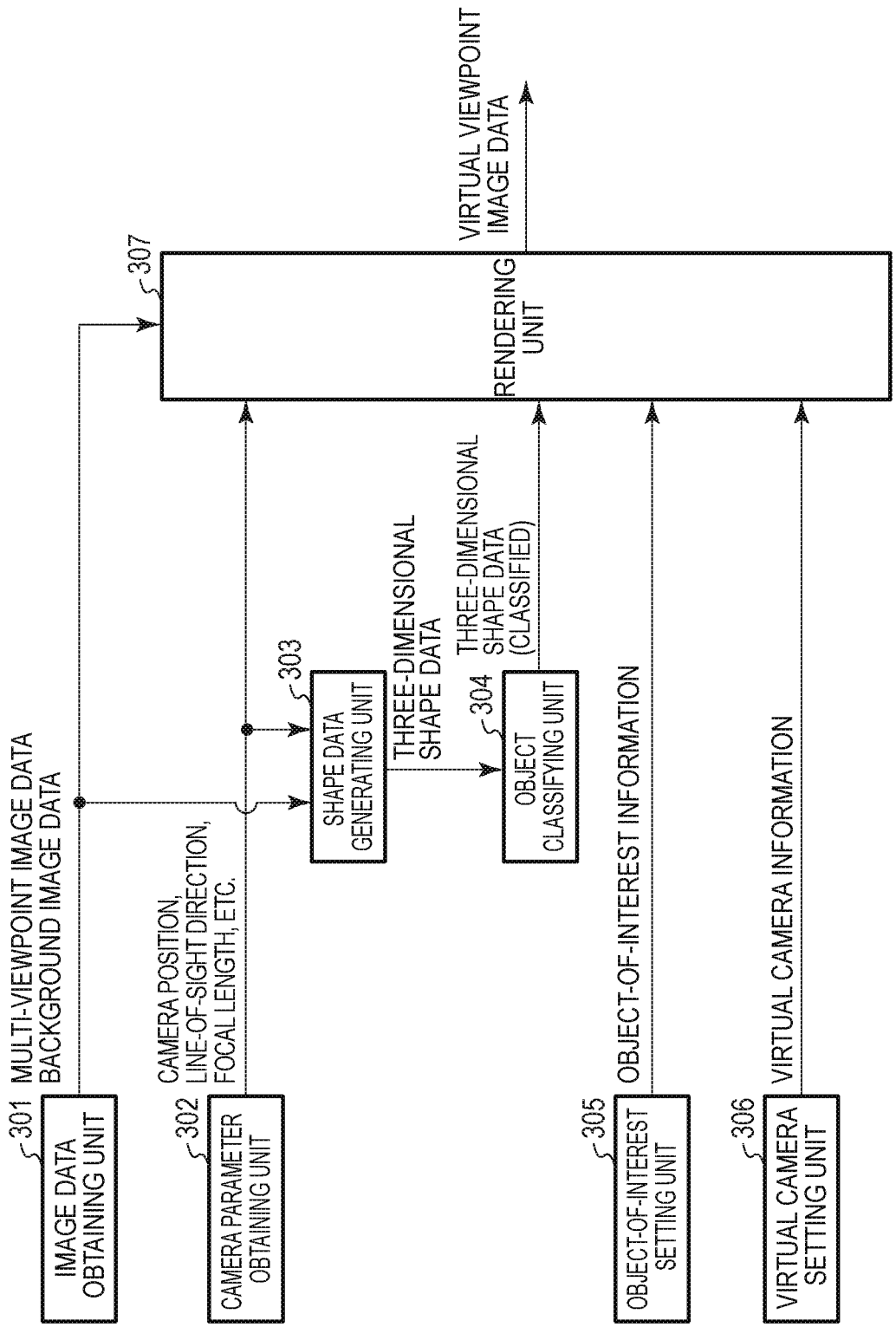
FIG. 3 is a functional block diagram of the image processing apparatus according to the present embodiment.

Subsequently, a series of image processes to be performed by the image processing apparatus 200 is described. FIG. 3 is a functional block diagram of the image processing apparatus 200 according to the present embodiment. The image processing apparatus 200 in the present embodiment includes an image data obtaining unit 301, a camera parameter obtaining unit 302, a shape data generating unit 303, an object classifying unit 304, an object-of-interest setting unit 305, a virtual camera setting unit 306 and a rendering unit 307. These elements are achieved by the CPU 201 of the image processing apparatus 200 executing a predetermined application program. Note that a part of the configuration illustrated in FIG. 3 may be achieved by hardware. Although the details of the elements are described later, the characteristics of the present embodiment are described as follows in an easily understandable way.

For example, the method disclosed in Japanese Patent Application Laid-Open No. 2010-20487 is used to thereby obtain shape information on the three-dimensional shapes of objects, such as people and a ball, in an imaging scene, from the multi-viewpoint images taken by the multiple cameras 101 having known positions and line-of-sight directions. The shapes of the objects in the three-dimensional space can be defined. Accordingly, depth images corresponding to the images taken by the respective cameras 101 can be obtained by calculation. The depth image is a set of pixels representing the distances between the viewpoint of the camera and points on the surface of the object. According to the same reason, a depth image in the line-of-sight direction from any viewpoint (virtual viewpoint) where the camera 101 is absent can also be generated. The colors of the pixels in the depth image can be obtained from the pixel values at corresponding positions in an actual taken image. Typically, to determine the color at any position P on the depth image, the color is calculated using the pixel values in images taken from viewpoints close to the virtual viewpoint where the position P is included for the depth image. Specifically, the pixel value Q (x, y) of a pixel of interest in the output virtual viewpoint image can be obtained by the following Expression (1).

$$Q(x,y) = \frac{\left(\frac{\theta_2}{\theta_1 + \theta_2} \times \frac{W_1(x_1, y_1)}{W_1(x_1, y_1) + W_2(x_2, y_2)}\right)}{W} P_1(x_1, y_1) + \frac{\left(\frac{\theta_1}{\theta_1 + \theta_2} \times \frac{W_2(x_2, y_2)}{W_1(x_1, y_1) + W_2(x_2, y_2)}\right)}{W} P_2(x_2, y_2) \qquad (1)$$

In Expression (1) described above, the angle $\theta 1$ is between the first input viewpoint and the virtual viewpoint, and the angle $\theta 2$ is between the second input viewpoint and the virtual viewpoint. The pixel value P1(x1, y1) is of the corresponding pixel (x1, y1) in the first input viewpoint, and the pixel value P2(x2, y2) is of the corresponding pixel (x2, y2) in the second input viewpoint. W1(x1, y1) represents the weight of the corresponding pixel (x1, y1) in a weight pixel map for the first input viewpoint. W2(x2, y2) represents the weight of the corresponding pixel (x2, y2) for the second input viewpoint. The weight W is represented by the following Expression (2).

$$W = \frac{\theta_2}{\theta_1 + \theta_2} \times \frac{W_1(x_1, y_1)}{W_1(x_1, y_1) + W_2(x_2, y_2)} + \frac{\theta_1}{\theta_1 + \theta_2} \times \frac{W_2(x_2, y_2)}{W_1(x_1, y_1) + W_2(x_2, y_2)} \qquad (2)$$

By repeating the calculation process described above, the pixel value representing the color of each of the pixels constituting the virtual viewpoint image can be obtained. Here, the case of using the images taken from two viewpoints close to the virtual viewpoint has been described. Alternatively, images taken from three or more viewpoints may be used.

The present embodiment has no limitation on the position of the virtual viewpoint or the line-of-sight direction. However, for example, in a case of generating the virtual viewpoint image including the object of interest (e.g., the player A), another object (e.g., the player B) can intervene between the virtual viewpoint and the player A and the important player A is shielded by the player B. Conventionally, in such a case, the user has to change the virtual viewpoint to a position where the player B does not become an obstruction. That is, the user should decline the virtual viewpoint image from an originally intended angle. In the present embodiment, the virtual viewpoint image allowing the entire object of interest to be viewed (not being obstructed by another object) can be generated at the angle intended by the user. Hereinafter, appropriately referring to a flowchart, a method of generating the virtual viewpoint image according to the present embodiment is described.

Figure 4:
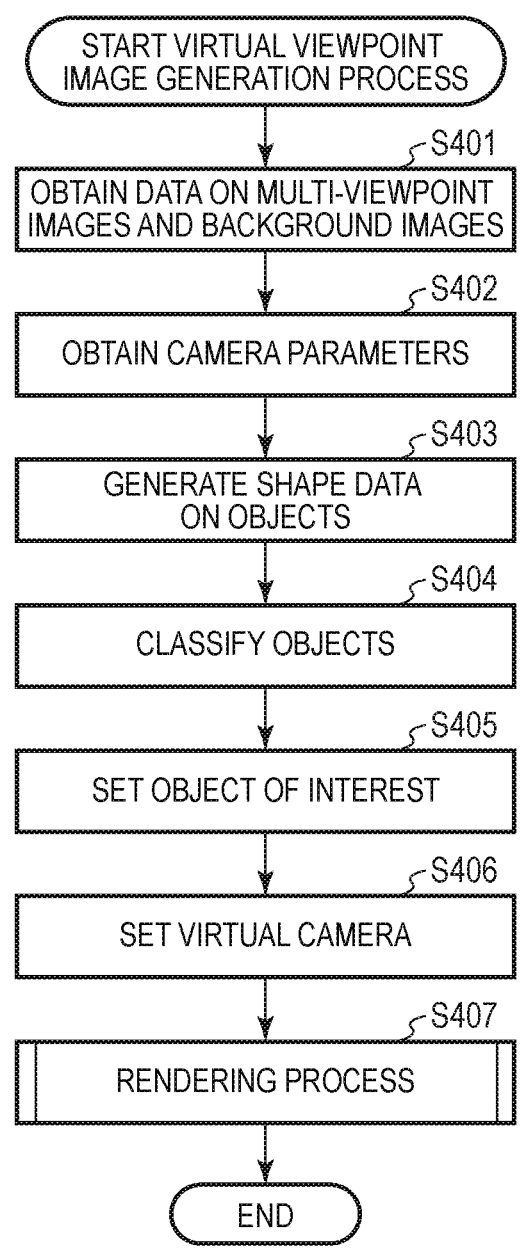
FIG. 4 is a flowchart illustrating the entire flow of a virtual viewpoint image generation process.

FIG. 4 is a flowchart illustrating the entire flow of a virtual viewpoint image generation process according to the present embodiment. This generation process is executed according to a corresponding program when the user selects a specific object priority mode via a GUI, not illustrated, for example. Note that the specific object priority mode may be selected by default. Description is hereinafter made according to the flow of FIG. 4.

In S401, the image data obtaining unit 301 obtains multi-viewpoint image data taken on any imaging scene by the cameras 101, and background image data on the same imaging scene. In a case of the image processing system illustrated in FIG. 1, the taken image data where a soccer scene on the field 105 are taken from ten different viewpoints, and background image data corresponding to the respective taken image data are received from the cameras 101 (or read from the HDD 204). Here, the background images are images where principal objects, such as players and a ball, are not captured. For example, as the background images in a case where the imaging scene is of a soccer, images taken at a time before or after a game or at halftime during which players, i.e., principal objects, are absent may be used. It should be noted that images taken before or after the event are sometimes inappropriate as background images because of adverse effects of variation in sunlight outdoors, for example. Data on the obtained multi-viewpoint images and background images are transmitted to the shape data generating unit 303 and the rendering unit 307.

In S402, the camera parameter obtaining unit 302 obtains the camera parameters described above. In the case of the image processing system illustrated in FIG. 1, preliminarily calibrated and obtained information on the installation positions, the line-of-sight directions and the lens focal lengths of the cameras 101 is read from the HDD 204. Alternatively, the camera parameters may be obtained by dynamic calibration through calculation of the amount of natural characteristics from taken images obtained by the cameras 101 during multi-viewpoint image taking. Data on the camera parameters are transmitted to the shape data generating unit 303 and the rendering unit 307.

In S403, the shape data generating unit 303 generates three-dimensional shape data on the objects that are present in the imaging scene, using the input multi-viewpoint image data, background image data and camera parameters. FIG. 5A illustrates an example of a table (object shape table) listing the three-dimensional shape data on an object-by-object basis. Each row in the table corresponds to an independent object. The shape of each object is identified by a set of voxels. Information (x, y, z) stored in the rows of the table represents three-dimensional position information at the center positions of the respective voxels. The shape data at this stage is in a state incapable of identifying what each object represents. Shade accompanying each object is also included as an independent object in the data. The shape data on each object (the object shape table that aggregates the data) is transmitted to the object classifying unit 304.

In S404, the object classifying unit 304 classifies the shape data included in the object shape table into those in a state capable of identifying what object the data represents. For example, in a case of classification into three types of objects including people, shade and the ball as in the present embodiment, classification can be made by preliminarily holding, in the HDD 204, three-dimensional model information (information on the sizes and shapes) on the people and ball and by performing a process of matching the information with each shape data. Parts having the same height components as a ground surface has can be classified as shade objects. The classified object shape table is assigned information representing the types of the objects, and IDs capable of identifying the respective objects. The objects classified as shade are assigned the IDs of objects that form the shape, as attribute information. FIG. 5B illustrates the object shape table having been subjected to the classification process. "ID", "Type" and "Attribute information" fields described above are added to the respective objects.

In S405, the object-of-interest setting unit 305 sets the object of interest among the objects in the imaging scene, based on a user operation. The user designates an object of interest through a UI screen (object-of-interest setting screen) as illustrated in FIG. 6, for example. An image 601 generated from an appropriate virtual viewpoint using the shape data is displayed on the object-of-interest setting screen. One or more objects of interest are selected on the image 601 through any of mouse and touch operations. At this time, the selected object is displayed in a highlighted manner, or a background area other than the selectable object is displayed in gray. When an OK button 602 is pressed in a state where one or more objects are selected, the object is set as the object of interest. The object of interest set in this manner is assigned, for example, a binary flag (interest flag) as information for identification from the other objects. FIG. 5C illustrates a situation where an "Interest flag" field is additionally set to the classified object shape table illustrated in FIG. 5B. In the interest flag in FIG. 5C, "1" indicates the object of interest, and "0" indicates a non-interest object. The UI screen for allowing the user to designate the object of interest is not limited to the example illustrated in FIG. 6. For example, in a case of many objects of interest, multiple virtual viewpoint images generated from different virtual viewpoints, or a virtual viewpoint image in a plan view may be displayed. Accordingly, even in a scene where multiple person objects are closely present, the user can easily designate a desired person object. Alternatively, objects that are not intended to be focused may be designated to thereby set the remaining object as the object of interest. Alternatively, a classified object shape table to which thumbnail images of the respective objects are added may be displayed to allow the object of interest to be designated through the ID. Alternatively, one or some of objects among the multiple objects may be designated as the objects of interest by default. For example, a ball may be set as the object of interest by default. Alternatively, for example, the ball and players therearound may be set as the objects of interest by default.

In S406, the virtual camera setting unit 306 sets information pertaining to the virtual camera in a virtual viewpoint image intended to be generated, specifically, information on the virtual viewpoint position and the line-of-sight direction, based on a user operation through a UI screen, not illustrated. Preliminarily set virtual viewpoint information (virtual camera information) that represents at least one of the position and direction of the virtual viewpoint may be read from the HDD 204 and be set.

Figure 7A:
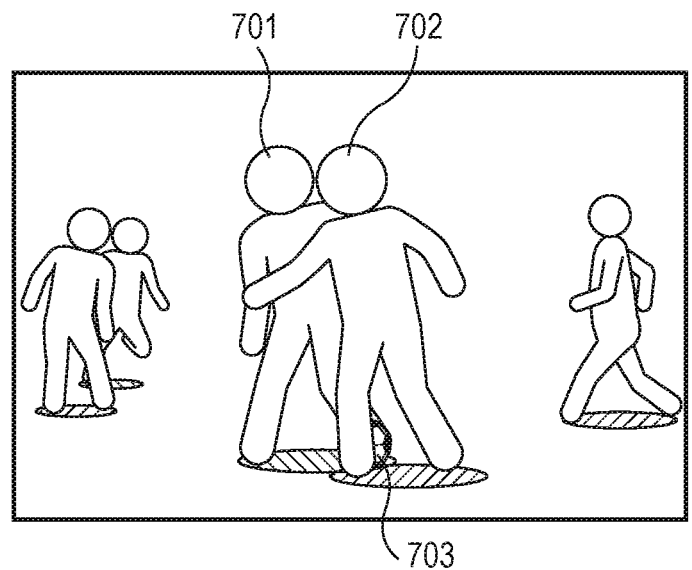
FIGS. 7A and 7B each illustrates an example of a virtual viewpoint image.
Figure 7B:
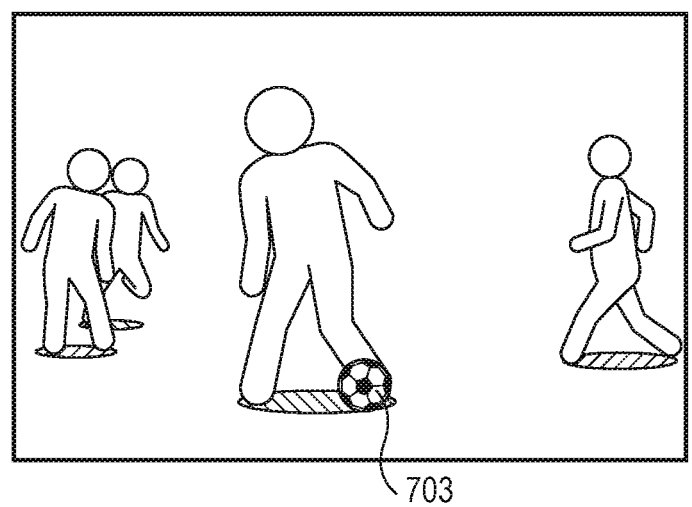

In S407, the rendering unit 307 performs the rendering process, based on the object shape table in the state in FIG. 5C and on the virtual camera information set in S406, and generates the virtual viewpoint image. The details of the rendering process are described later. FIGS. 7A and 7B illustrate an example of the virtual viewpoint image on a scene where two players 701 and 702 and a ball 703 are present; the image is generated in the present embodiment. FIG. 7A illustrates a virtual viewpoint image according to the conventional method. In this diagram, the player A and the ball, whose motions are intended to be viewed, are shielded by the player B. FIG. 7B illustrates the virtual viewpoint image according to the present embodiment in a case where the player A and the ball are designated as objects of interest. Here, the player B who has become an obstruction is subjected to a transparent process at a transmittance of 100%, and the player A and the ball, which are to be focused on, are in a clearly visible state. The virtual viewpoint image achieved as described above is output in various modes; for example, the image is displayed on the display apparatus 212, or stored in the HDD 204 or the external memory 211.

The overview of the virtual viewpoint image generation process according to the present embodiment has thus been described.

<Rendering Process>

Figure 8:
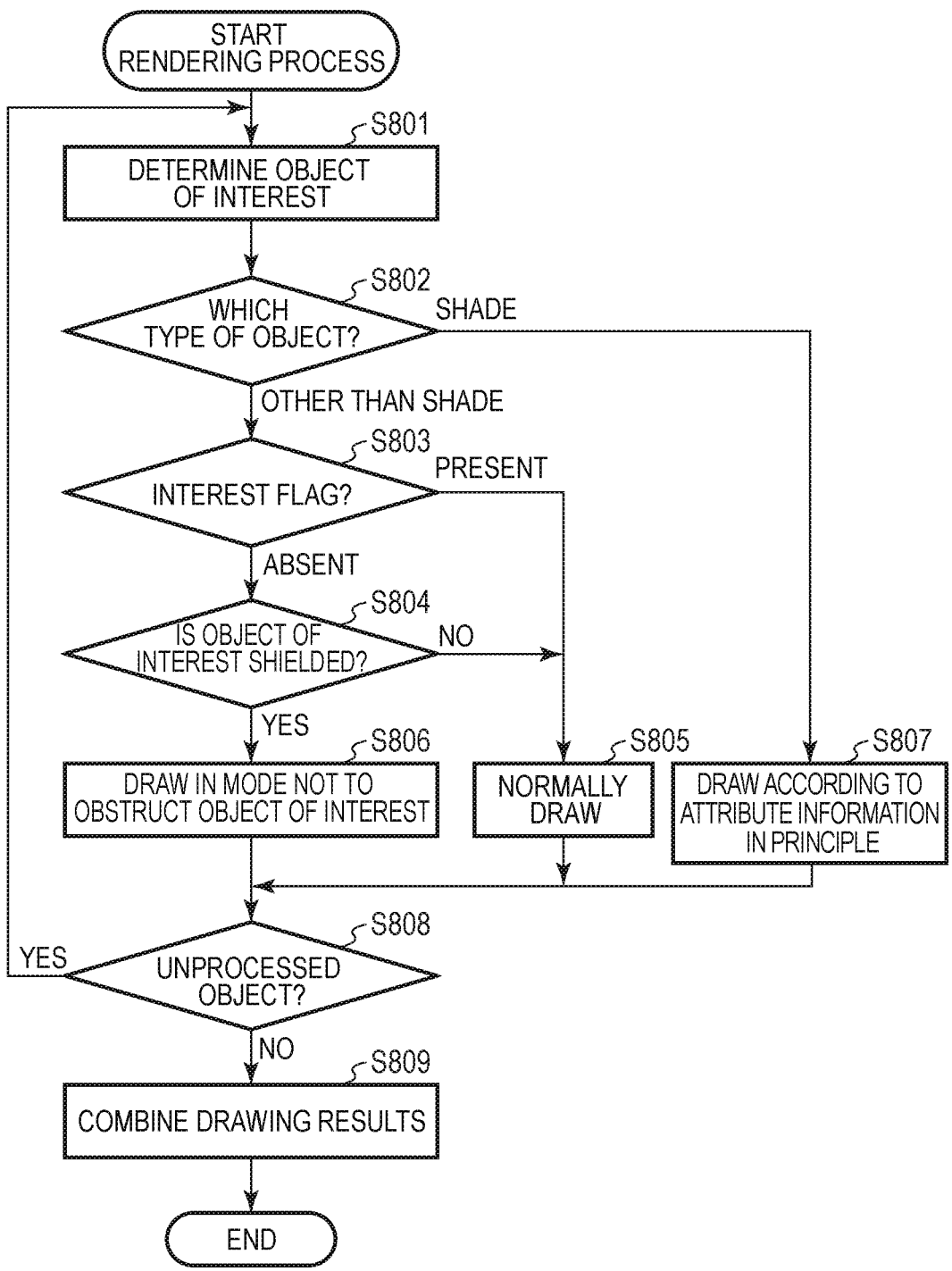
FIG. 8 is a flowchart illustrating the details of a rendering process.
Figure 9:
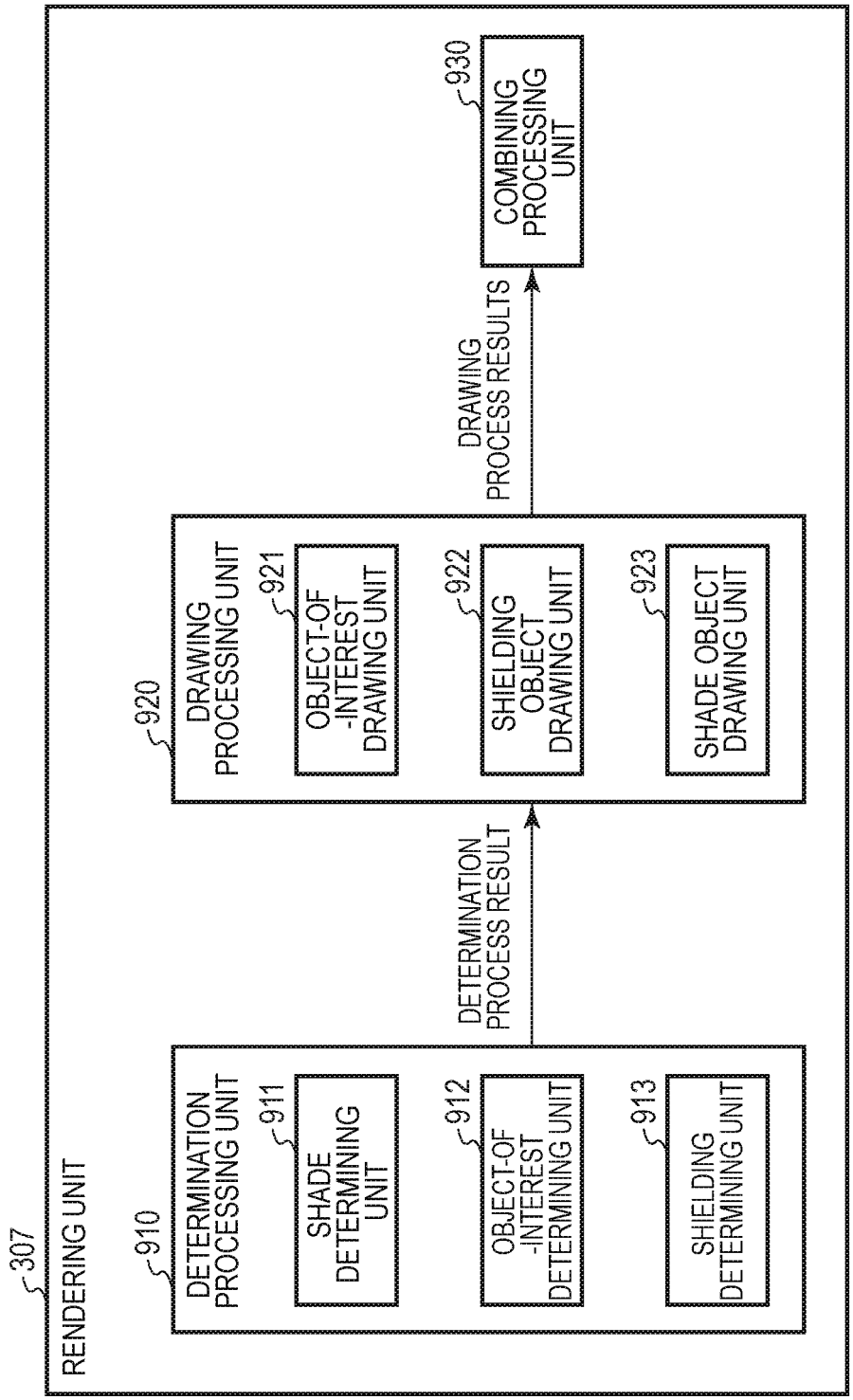
FIG. 9 is a block diagram illustrating an internal configuration of a rendering unit.

FIG. 8 is a flowchart illustrating the details of the rendering process to be executed by the rendering unit 307 in the specific object priority mode. FIG. 9 is a block diagram illustrating the internal configuration of the rendering unit 307. The rendering unit 307 includes a determination processing unit 910, a drawing processing unit 920 and a combining processing unit 930. Furthermore, the determination processing unit 910 includes a shade determining unit 911, an object-of-interest determining unit 912 and a shielding determining unit 913. The drawing processing unit 920 includes an object-of-interest drawing unit 921, a shielding object drawing unit 922 and a shade object drawing unit 923. Hereinafter, referring to the flowchart of FIG. 8 and the block diagram of FIG. 9, the details of the rendering process are described.

First, in S801, the determination processing unit 910 determines one noted object in the object shape table as a drawing target (hereinafter, a noted object). Typically, the object having the minimum ID value is determined as the noted object. In subsequent S802, the shade determining unit 911 refers to the "Type" field of the object shape table and determines whether the noted object is the shade object or not. If the noted object is the shade object, the processing proceeds to S807. On the contrary, if the noted object is an object other than the shade object, the processing proceeds to S803.

In S803, the object-of-interest determining unit 912 refers to the "Interest flag" field of the object shape table and determines whether the noted object is the object of interest or not. If the noted object is the object of interest, the processing proceeds to S805. If not the object of interest, the processing proceeds to S804.

In S804, the shielding determining unit 913 determines whether the noted object shields the object of interest or not. The shielding determining unit 913 determines whether the object is shielded or not based on the position of the virtual camera, the position of the noted object and the position of the object of interest in the three-dimensional space. For example, the shielding determining unit 913 can make determination by virtually emitting a light beam from the virtual viewpoint position included in the virtual camera information set in S406 toward the object of interest and by determining whether or not the light beam collides with the noted object before reaching the object of interest. For example, shielding determination using the following Expression (3) can also be made.

$$L > L' \text{ and } \theta < \theta\_Th \quad (3)$$

The above Expression (3) is for determining whether or not the noted object is disposed short of the object of interest when being viewed from the virtual viewpoint, and the angles of both the objects are close to each other. In the Expression (3), the distance is between the virtual viewpoint position and the object of interest, and the distance L' is between the virtual viewpoint position and the noted object. The angle θ is between the object of interest and the noted object with reference to the virtual viewpoint position. The threshold θ_Th is preset for the angle θ. The threshold θ_Th can be obtained from the actual size of the object of interest and the distance L to the virtual viewpoint position. For example, in a case where the object of interest having a lateral width of about 1 m is present 20 m away from the virtual viewpoint position, θ less than three degrees makes the object of interest shielded by the noted object that resides short thereof. That is, in this case, in a case where the Expression (3) with θ_Th of three degrees is satisfied, it can be determined that the noted object is positioned to shield the object of interest when being viewed from the virtual viewpoint. As a result of the determination, when the noted object does not shield the object of interest, the processing proceeds to S805. On the contrary, when the noted object shields the object of interest, the processing proceeds to S806.

In S805, the object-of-interest drawing unit 921 performs a process of drawing the noted object according to a normal method, that is, in a state where the visibility of the taken image is maintained. This step is a drawing process in a case where the noted object is the object of interest or a case where the noted object is another object that does not shield the object of interest. That is, the object serving as a drawing target in this step is required to be drawn in a visualized state in the virtual viewpoint image to an extent comparable to the taken image to allow the user to recognize the object favorably. Accordingly, a process (normal drawing process) is performed that generates the depth image where the noted object is viewed from the set virtual viewpoint and of obtaining the colors of the pixels of the depth image from the pixel values at the positions corresponding to the predetermined multi-viewpoint images.

Figure 10:
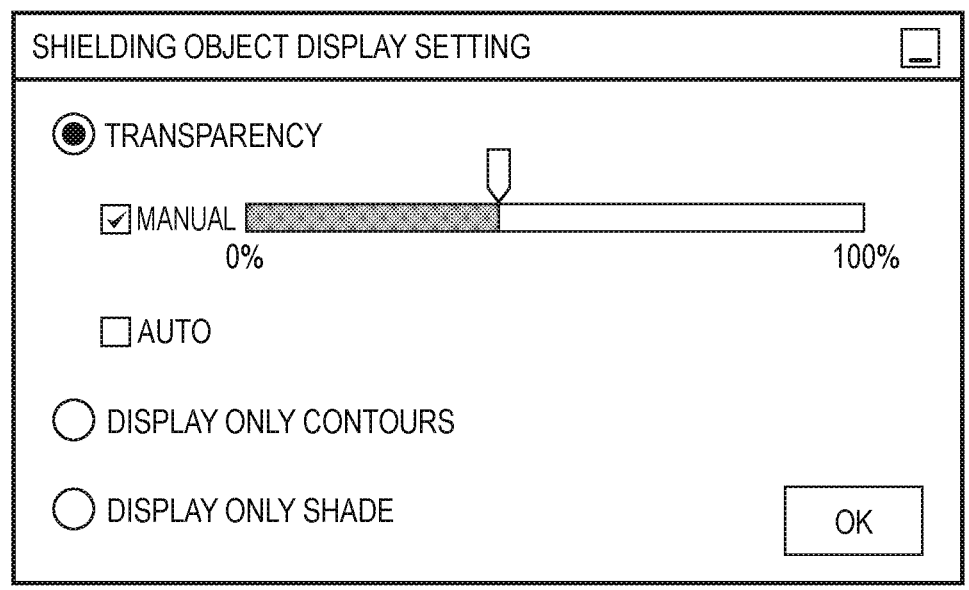
FIG. 10 illustrates an example of a shielding object display setting screen.
Figure 11A:
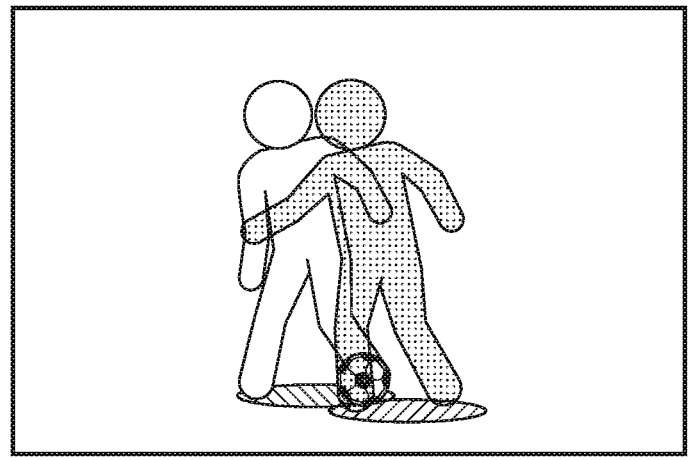
FIGS. 11A, 11B and 11C illustrates drawing examples of a shielding object in respective display modes.
Figure 11B:
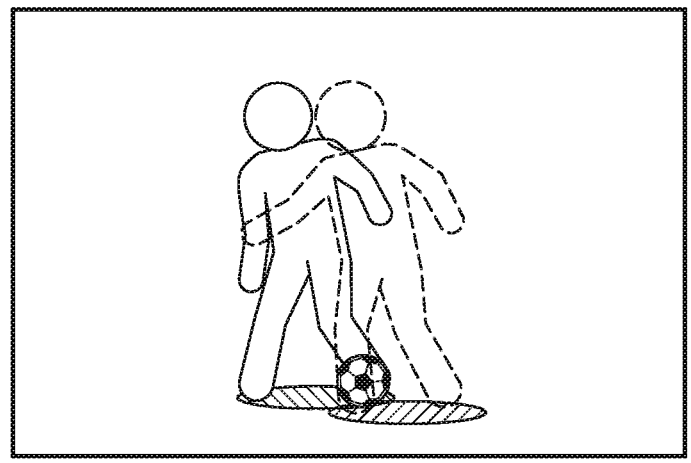
Figure 11C:
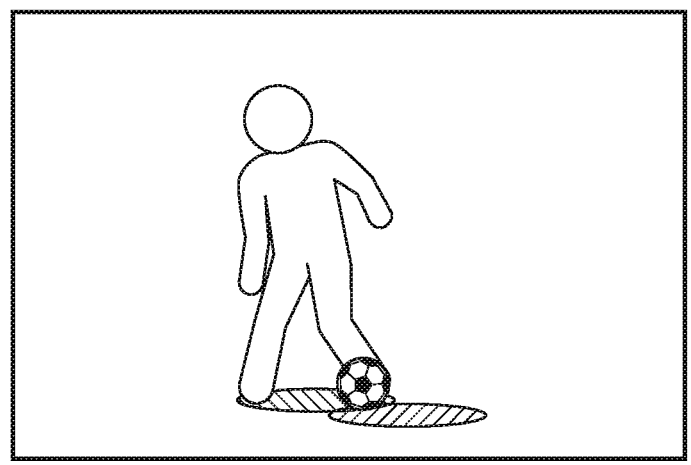

In S806, the shielding object drawing unit 922 performs a process of drawing with the noted object being made transparent. In a case where the shielding object is made completely transparent, it can be said that this object is not drawn. This step is a drawing process in a case where the noted object shields the object of interest designated by the user. That is, if the object (shielding object) serving as the drawing target in this step is drawn in a completely visualized state, this object shields the object of interest and obstructs the visibility. The shielding object is desirably drawn not to suppress the visibility of the object of interest. Methods of suppressing reduction in the visibility of the object of interest include making the shielding object transparent or translucent, and for example, a mode of displaying only the contour of the shielding object in a predetermined color or with broken lines, and a mode of displaying only the shade of the shielding object. FIG. 10 illustrates an example of a UI screen (shielding object display setting screen) for designating the display mode of the shielding object. The user can designate a method of drawing the shielding object, among the alternatives, through an operation of a mouse. FIGS. 11A to 11C illustrate variations of display modes.

FIG. 11A illustrates a case of drawing the shielding object in a translucent manner. FIG. 11B illustrates a case of drawing only the contour. FIG. 11C illustrates a case of only drawing the shade. In this case, for example, when drawing is performed with complete transparency having a transmittance of 100% (see FIG. 7B), the drawing may be performed with the shape data on the shielding object being excluded. Here, the shielding object is also included in the multi-viewpoint images used for calculating the pixel values. Accordingly, a mask process may be performed so as not to use the pixel values of a part corresponding to the shielding object. A mask image to be used for the mask process may be obtained by inversely projecting the shielding object onto the multi-viewpoint images to be used to calculate the pixel values, for example. Accordingly, a binary mask image can be obtained where only the shape part of the shielding object is represented in white (the pixel values of the part are not used) and the other parts are represented in black (the pixel values of the parts are used). Alternatively, a mask image having N-value (N=the number of classification types+1) may be generated, and it may be determined whether the pixel values of the part are used (not made transparent) or not used (made transparent) according to the values corresponding to the types of the object. For example, in a case where moving objects in the imaging scene are the person A, the person B and the ball, the number of types is three. Consequently, a 4-value image is generated. When the object of interest to be focused are the person A and the ball, the mask process is performed such that the pixel values corresponding to these parts are used but the pixel values corresponding to the other parts (the person B and the background) are not used. In the case of translucent drawing, only the shielding object may be preliminarily drawn, and blending may be performed with any transparency. As illustrated in the UI screen of FIG. 10 described above, the transmittance in this case may be manually set by the user in a range from 0 to 100%, for example, or automatically determined according to the positional relationship with the object of interest. The transparency α in the case of automatic determination is determined to be 0 (opaque) in a case of L<L', to be higher with reduction in θ (increase in shielding degree), and to be higher with reduction in L (the virtual viewpoint being closer to the object of interest), using L, L' and θ described above, for example. Alternatively, the determination may be made in a more simplified manner, for example, using the following Expression (4).

$$\alpha = k/(L \times \theta + C) \quad (4)$$

In the above Expression (4), k is a coefficient, and C is a constant to achieve a non-zero denominator. The shielding object drawing method is not limited to the details described above. The point is that drawing can be performed in a manner of suppressing reduction in the visibility of the object of interest.

In S807, the shade object drawing unit 923 performs a process of drawing the noted object according to the attribute information described above. This step is a drawing process in a case where the noted object is an object representing the shade of the person or the ball. Typically, the shade object does not exist as an independent object. Consequently, in principle, drawing is desirable to conform to the drawing states of the people or the ball upon which the shade object is dependent. That is, in a case where the dependent destination person object is drawn in a visualized state (normally drawn), the shade object is also drawn in a clearly visualized state. In a case where the person object is drawn in a transparent state, for example, the shade object is desired to be drawn also in the transparent state (with the shade being eliminated). The object upon which the shade object is dependent can be identified by referring to the "Attribute information" field of the object shape table. When the shade object is drawn in the transparent state, a natural drawing result cannot be achieved only by removing the shape data in some cases. This is because the shade is included in all the multi-viewpoint images to be used to calculate the pixel values and pixel values suited for the transparent state do not exist at the corresponding pixel positions. Accordingly, to eliminate the shade in a natural manner, drawing may be performed using the pixel values at the corresponding positions in the background image, for example. In a case of the shade object dependent upon the shielding object, the details set in the UI screen in FIG. 10 described above have a priority. That is, when only the shade is designated to be displayed on the UI screen for designating the display mode of the shielding object, the normal drawing process is performed in a manner analogous to that in S805 even with setting where the dependent-destination shielding object is drawn in the transparent state.

In S808, the drawing processing unit 920 determines whether or not drawing of all the objects in the object shape table have been completed or not. If any unprocessed object remains, the processing returns to S801, where the next noted object is determined and the processing is continued. On the contrary, the process of all the objects have been completed, the processing proceeds to S809.

In S809, the combining processing unit 930 combines all the objects' drawing results generated in steps 805 to 807 to generate a virtual viewpoint image viewed from the virtual viewpoint set in S406.

The details of the rendering process executed by the rendering unit 307 have thus been described. The present embodiment has thus been described assuming that each step illustrated in the flow of FIG. 8 is executed by the rendering unit. However, the execution is not limited thereto. For example, multiple rendering units having the same configuration may be provided. The rendering units may be classified into rendering units for drawing the shielding object and rendering units for drawing the other objects, processing may be performed in parallel, and drawing results obtained by the rendering units may be combined. Alternatively, independent image processing units corresponding to the determination processing unit 910, the drawing processing unit 920 and the combining processing unit 930 may be provided, and the roles may be allotted for the respective functions.

In the embodiment described above, it is determined whether or not transparent drawing is performed during rendering according to the presence or absence of the interest flag. The present embodiment is not limited thereto. For example, the interest degree (priority order) may be designated for each object, and it may be determined whether or not to regard the object as an obstructive object according to the set interest degree (whether or not to perform drawing in a transparent manner during rendering). For example, when a person object having a higher interest degree than the object concerned has is shielded, the object having the higher interest degree is subjected to the transparent process. On the contrary, even when a person object having a lower interest degree than the object concerned has is shielded, the object having the lower interest degree is not subjected to the transparent process. When the interest degree is set as described above, level information representing the priority order, instead of (or in addition to) the interest flag, may be added to each object. During rendering, the level information may be referred to and the details of drawing may be controlled.

In the embodiment described above, the example of the case where the user individually designates the object of interest among the objects has been mainly described. However, the description is not limited thereto. For example, the user may set a certain condition, and the image processing apparatus 200 may automatically set an object satisfying the condition as an object of interest, based on the object information on each object. More specifically, the user may set a condition "the ball and a player positioned therearound", or a condition "a kicker and a goalkeeper during a PK (penalty kick)". Players in a specific team may be normally drawn, and players in the other team may be thinly drawn. If the method of setting the object of interest has a degree of freedom as described above, the usability for the user can be improved.

Although the nomenclatural term of the virtual viewpoint image is adopted in the above description, the system of the present embodiment is applicable both to still images and moving images. That is, the multi-viewpoint images may be one or more still images or be moving images. The virtual viewpoint images may be generated as one or more still images or as moving images.

In a case where the virtual viewpoint image is generated as a moving image, the virtual camera information and the object of interest in each of frames constituting the moving image may be set by the user on a frame-by-frame basis. Alternatively, these information and object may be continuously set along the temporal axis. For example, the trajectory of the virtual viewpoint may be set. The object of interest set by the user in the beginning frame may be automatically set to the subsequent frame according to a tracking technique. Accordingly, the virtual camera information and the object of interest that are changeable in a time series manner in a case where the data to be input and output is a moving image can be effectively set.

The background image may be obtained by eliminating the moving object using a predetermined number of frames (e.g., ten seconds of continuous frames) in the multi-viewpoint image stored as the moving image, for example. For example, the background image can be obtained by generating an image where the medians of the pixel values in the frames are adopted.

In a case where the virtual viewpoint image as a moving image is generated from multi-viewpoint images as moving images, the object of interest can sometimes be shielded by the non-interest object temporarily, i.e., in units of frames, according to the position and motion of the object, the virtual viewpoint position and its movement trajectory (virtual camera path). In this case, the time point (frame) when the object of interest is shielded may be notified to the user. FIG. 12 illustrates an example of the UI screen that visually represents a range in which the object of interest is shielded by the shielding object in the set virtual camera path. In the UI screen of FIG. 12, the virtual camera path set by the user is indicated with a solid line 1201 on the virtual viewpoint image in a case where the field is viewed in a plan view. A segment where the noted object is shielded by another object is shielded is displayed with a thick line 1202 in an enhanced manner. The presence or absence of shielding can be determined based on the result of the shielding determination for all the noted objects (S804 in the flowchart of FIG. 8). At the time when both the virtual camera path and the object of interest are determined, the shielding range is identified. Consequently, notification may be made at the identified timing, for example, the time at which the virtual camera path is set in a case where the object of interest is previously set. Such notification allows the user to obtain the virtual viewpoint video having a higher satisfactory degree by changing the method of displaying the object that shields the noted object.

As described above, according to the present embodiment, reduction in the visibility of the object of interest in the virtual viewpoint image can be suppressed even in the case where the object of interest is shielded by another object from the set virtual viewpoint.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223080, filed Nov. 20, 2017, which is hereby incorporated by reference herein in its entirety.

What is claimed is:

1. An image processing apparatus, comprising:
one or more hardware processors; and
one or more memories which store instructions executable by the one or more hardware processors to cause the image processing apparatus to perform at least:
obtaining images based on image capturing from different directions by a plurality of image capturing devices capturing an imaging area;
obtaining viewpoint information that indicates a virtual viewpoint;
setting priorities of objects in the imaging area;
generating a virtual viewpoint image based on the obtained images and the obtained viewpoint information, so that in the virtual viewpoint image, an object in the imaging area is displayed with transparency, determined based on a priority set for the object; and setting whether a shadow of an occluding object is displayed or not in the virtual viewpoint image, based on a user operation, wherein transparency of a first object is higher than transparency of a second object in a case where the first object is at a position that occludes the second object whose priority is higher than a priority of the first object, wherein the transparency of the first object is not higher than transparency of a third object in a case where the first object is at a position that occludes the third object whose priority is not higher than the priority of the first object, and wherein, even if the first object is made transparent, a shadow of the first object is displayed in the virtual viewpoint image based on setting that the shadow of the occluding object is displayed in the virtual viewpoint image.

2. The image processing apparatus according to claim 1, wherein the first object is not displayed in a case where the first object is at a position that occludes the second object.

3. The image processing apparatus according to claim 1, wherein the instructions are executable by the one or more hardware processors to further cause the image processing apparatus to:

identify an occluding object at a position that occludes another object, based on a position and a view direction of the virtual viewpoint indicated by the virtual viewpoint information and on positions of objects in the imaging area, and wherein the virtual viewpoint image is generated based on an identification result of the identifying.

4. The image processing apparatus according to claim 1, wherein the first object has a transparency varying according to a distance between the first object and the virtual viewpoint.

5. The image processing apparatus according to claim 1, wherein a transparency of the first object varies depending on a difference between a direction from the virtual viewpoint to the first object and a direction from the virtual viewpoint to the second object.

6. The image processing apparatus according to claim 1, wherein the priorities of the objects are set based on a designating operation.

7. The image processing apparatus according to claim 1, wherein the instructions are executable by the one or more hardware processors to further cause the image processing apparatus to:

obtain object information pertaining to at least any of the objects; and wherein the priority is set based on the obtained object information.

8. The image processing apparatus according to claim 7, wherein the object information includes information for specifying attributes of an object.

9. The image processing apparatus according to claim 1, wherein the first object is not made transparent in a case where the first object does not occlude any other object.

10. The image processing apparatus according to claim 1, wherein, based on setting that the shadow of the occluding object is not displayed in the virtual viewpoint image, a shadow of the first object is not displayed in a case where the first object is made transparent.

11. The image processing apparatus according to claim 1, wherein the instructions are executable by the one or more hardware processors to further cause the image processing apparatus to:

set at least any of (i) a transparency of an occluding object at the position that occludes another object, and (ii) whether a contour of the occluding object is displayed or not, and wherein the virtual viewpoint image is generated according to the setting.

12. The image processing apparatus according to claim 1, wherein the instructions are executable by the one or more hardware processors to further cause the image processing apparatus to:

output information that indicates whether or not the generated virtual viewpoint image includes an occluding object at the position that occludes another object.

13. The image processing apparatus according to claim 1, wherein a priority of an object positioned around a specific object is set higher than a priority of an object positioned not around the specific object.

14. The image processing apparatus according to claim 1, wherein the objects in the imaging area include players of a sports game, and wherein priorities of objects belonging to one team of the sports game is set higher than priorities of objects belonging another team of the sports game.

15. An image processing method comprising:

obtaining images based on image capturing from different directions by a plurality of image capturing devices capturing an imaging area;

obtaining viewpoint information that indicates a virtual viewpoint;

setting priorities of objects in the imaging area;

generating a virtual viewpoint image based on the obtained images and on the obtained viewpoint information, so that in the virtual viewpoint image, an object in the imaging area is displayed with transparency determined based on a priority set for the object; and setting whether a shadow of an occluding object is displayed or not in the virtual viewpoint image, based on a user operation, wherein transparency of a first object is higher than transparency of a second object in a case where the first object is at a position that occludes the second object whose priority is higher than a priority of the first object, wherein the transparency of the first object is not higher than transparency of a third object in a case where the first object is at a position that occludes the third object whose priority is not higher than the priority of the first object, and wherein, even if the first object is made transparent, a shadow of the first object is displayed in the virtual viewpoint image based on setting that the shadow of the occluding object is displayed in the virtual viewpoint image.

16. The image processing method according to claim 15, further comprising identifying an occluding object at a position that occludes another object, based on a position and a view direction of the virtual viewpoint indicated by the virtual viewpoint information and on positions of objects in the imaging area, wherein the virtual viewpoint image is generated based on an identification result of the identifying.

17. A non-transitory computer-readable storage medium storing a program for causing a computer to execute an image processing method, the image processing method comprising:
    obtaining images based on image capturing from different directions by a plurality of image capturing devices capturing an imaging area;
    obtaining viewpoint information that indicates a virtual viewpoint;
    setting priorities of objects in the imaging area;
    generating a virtual viewpoint image based on the obtained image and on the obtained viewpoint information, so that in the virtual viewpoint image, an object in the imaging area is displayed within transparency determined based on a priority set for the object; and
    setting whether a shadow of an occluding object is displayed or not in the virtual viewpoint image, based on a user operation,
    wherein transparency of a first object is higher than transparency of a second object in a case where the first object is at a position that occludes the second object whose priority is higher than a priority of the first object,
    wherein the transparency of the first object is not higher than transparency of a third object in a case where the first object is at a position that occludes the third object whose priority is not higher than the priority of the first object, and
    wherein, even if the first object is made transparent, a shadow of the first object is displayed in the virtual viewpoint image based on setting that the shadow of the occluding object is displayed in the virtual viewpoint image.

* * * * *